United States Patent
Benisty et al.

(10) Patent No.: US 12,360,701 B2
(45) Date of Patent: Jul. 15, 2025

(54) WRITE COALESCING VIA HMB TO OPTIMIZE WRITE PERFORMANCE

(71) Applicant: Western Digital Technologies, Inc., San Jose, CA (US)

(72) Inventors: Shay Benisty, Beer Sheva (IL); Alexander Bazarsky, Holon (IL); Judah Gamliel Hahn, Ofra (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 29 days.

(21) Appl. No.: 17/885,265

(22) Filed: Aug. 10, 2022

(65) Prior Publication Data

US 2024/0053923 A1    Feb. 15, 2024

(51) Int. Cl.
G06F 3/06    (2006.01)

(52) U.S. Cl.
CPC .......... G06F 3/0659 (2013.01); G06F 3/0604 (2013.01); G06F 3/0656 (2013.01); G06F 3/0673 (2013.01)

(58) Field of Classification Search
None
See application file for complete search history.

(56) References Cited

U.S. PATENT DOCUMENTS

| | | | |
|---|---|---|---|
| 10,521,118 B2* | 12/2019 | Benisty | G06F 3/0688 |
| 10,635,580 B2 | 4/2020 | Bordia et al. | |
| 10,970,235 B2 | 4/2021 | Hong et al. | |
| 10,991,422 B2 | 4/2021 | Huang et al. | |
| 11,093,174 B1 | 8/2021 | Jang et al. | |
| 2013/0007381 A1 | 1/2013 | Palmer | |
| 2016/0267016 A1 | 9/2016 | Lee et al. | |
| 2018/0018101 A1* | 1/2018 | Benisty | G06F 3/0659 |
| 2018/0341429 A1 | 11/2018 | Bolkhovitin et al. | |
| 2019/0042092 A1* | 2/2019 | Wu | G06N 3/063 |
| 2020/0097212 A1* | 3/2020 | Lakshman | G06F 3/0656 |
| 2021/0064290 A1 | 3/2021 | Kanno et al. | |

FOREIGN PATENT DOCUMENTS

WO    2017074571 A1    5/2017

OTHER PUBLICATIONS

"Scatter/gather operations", HDK technical reference, Jun. 2005, The SCO group Inc. http://osr600doc.sco.com/en/HDK_concepts/ddT_scgth.html#:~:text=A%20scatter%2Fgather%20list%20is,in%20some%20driver%2Dspecific%20fashion. (Year: 2005).*
"An NVM Express Tutorial"; Kevin Marks; Dell, Inc.; Flash memory summit 2013 (Year: 2013).*

* cited by examiner

*Primary Examiner* — Michael Alsip
(74) *Attorney, Agent, or Firm* — PATTERSON + SHERIDAN, LLP (57) ABSTRACT

The present disclosure generally relates to improved handling of write commands. The host memory buffer (HMB) or other storage space can be utilized to delay execution of host write commands which will improve write performance in different use cases and will also allow having more concurrent streams than open blocks without impacting write or read performance. Generally, once a write command is received, the write command is revised as a new write command that is logically equivalent to the original write command. The revised write command is moved to the HMB along with the data. In so doing, the write command is coalesced and write command handling is improved.

18 Claims, 8 Drawing Sheets

WRITE COALESCING VIA HMB TO OPTIMIZE WRITE PERFORMANCE

BACKGROUND OF THE DISCLOSURE

Field of the Disclosure

Embodiments of the present disclosure generally relate to improved write command processing.

Description of the Related Art

Write performance is important for both client and server storage applications and is one of the most important metrics to clients. Write performance may be hindered in different use cases limited by the system resources. For example, the data storage device usually holds an open block for each stream ID that the host currently uses, so that data written from a stream ID is written to the corresponding open block.

When the number of open blocks in the data storage device is smaller than the number of different streams, there is a problem which may result in excessive writes and reads—reducing the write performance. When a host writes data to a data storage device, it may be useful to temporarily store the data in an intermediate space to perform some operation before actually writing the data to the storage media. This intermediate storage space may be a dedicated buffer inside the storage space of the data storage device—but in order to save space—it may instead be the Host Memory Buffer (HMB), which is located in the host. The HMB is a host storage space dedicated to the storage controller's needs. Usually, the HMB stores management tables or other management data according to the controller's configuration.

In existing architectures, written data is passed directly from the host's data buffers to the controller of the data storage device by a hardware (HW) module once the corresponding write command is interpreted. The information about the command interpretation is passed to the completion queue. The write data itself isn't necessarily written immediately to the memory device but may be stored in cache. The cache may either be in the data storage device or on the host side in the HMB.

When the number of concurrent streams is higher than the number of open blocks, the data coming from the streams may be written to the same open blocks—impairing read throughput later. Data from those extra streams may also be relocated later on inducing write amplification. Alternatively, the host may be limited to the number of streams dictated by the number of open blocks.

Therefore, there is a need in the art for improved handling of write commands.

SUMMARY OF THE DISCLOSURE

The present disclosure generally relates to improved handling of write commands. The host memory buffer (HMB) or other storage space can be utilized to delay execution of host write commands which will improve write performance in different use cases and will also allow having more concurrent streams than open blocks without impacting write or read performance. Generally, once a write command is received, the write command is revised as a new write command that is logically equivalent to the original write command. The revised write command is moved to the HMB along with the data. In so doing, the write command is coalesced and write command handling is improved.

In one embodiment, a data storage device comprises: a first memory device; and a controller coupled to the memory device, wherein the controller is configured to: receive a write command; determine the write command can be write coalesced; allocate one or more buffers in a second memory device separate and distinct from the first memory device; generate a revised write command from the write command; and move data associated with the write command to at least one buffer of the allocated one or more buffers.

In another embodiment, a data storage device comprises: a first memory device; and a controller coupled to the memory device, wherein the controller is configured to: receive a write command; revised the write command to create a revised write command; store the revised write command in a second memory device distinct from the first memory device; determine that a predetermined period of time has elapsed or a trigger mechanism has occurred; and execute the revised write command.

In another embodiment, a data storage device comprises: memory means; and a controller coupled to the memory means, wherein the controller is configured to: convert a write command from physical region page (PRP) entries to scatter-gather list (SGL) entries; store data associated with the PRP entries and the converted write command in a host device; inform the host device that the write command is completed; and execute the converted write command after the informing, wherein the executing comprises writing the stored data to the memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved handling of write commands. The host memory buffer (HMB) or other storage space can be utilized to delay execution of host write commands which will improve write performance in different use cases and will also allow having more concurrent streams than open blocks without impacting write or read performance. Generally, once a write command is received, the write command is revised as a new write command that is logically equivalent to the original write command. The revised write command is moved to the HMB along with the data. In so doing, the write command is coalesced and write command handling is improved.

Figure 1:
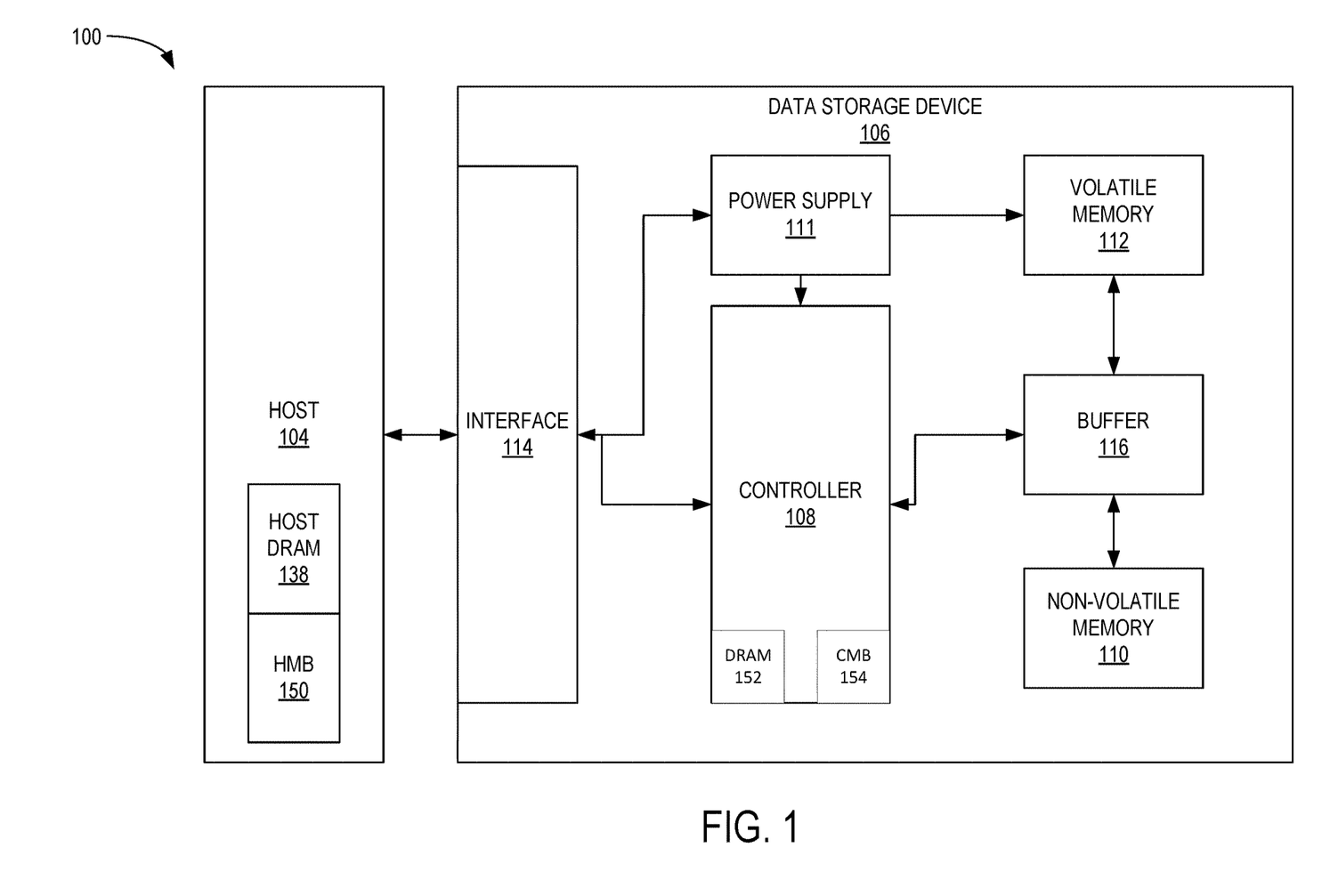
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138 and, optionally, a host memory buffer 150. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116.

In some examples, the data storage device 106 may include additional components not shown in FIG. 1 for the sake of clarity. The controller 108 may include volatile memory such as DRAM 152 as well as a controller memory buffer (CMB) dedicated for host device 104 usage. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3 L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108 (i.e., a second volatile memory), which may be SRAM memory, prior to sending the data to the NVM 110.

Figure 2:
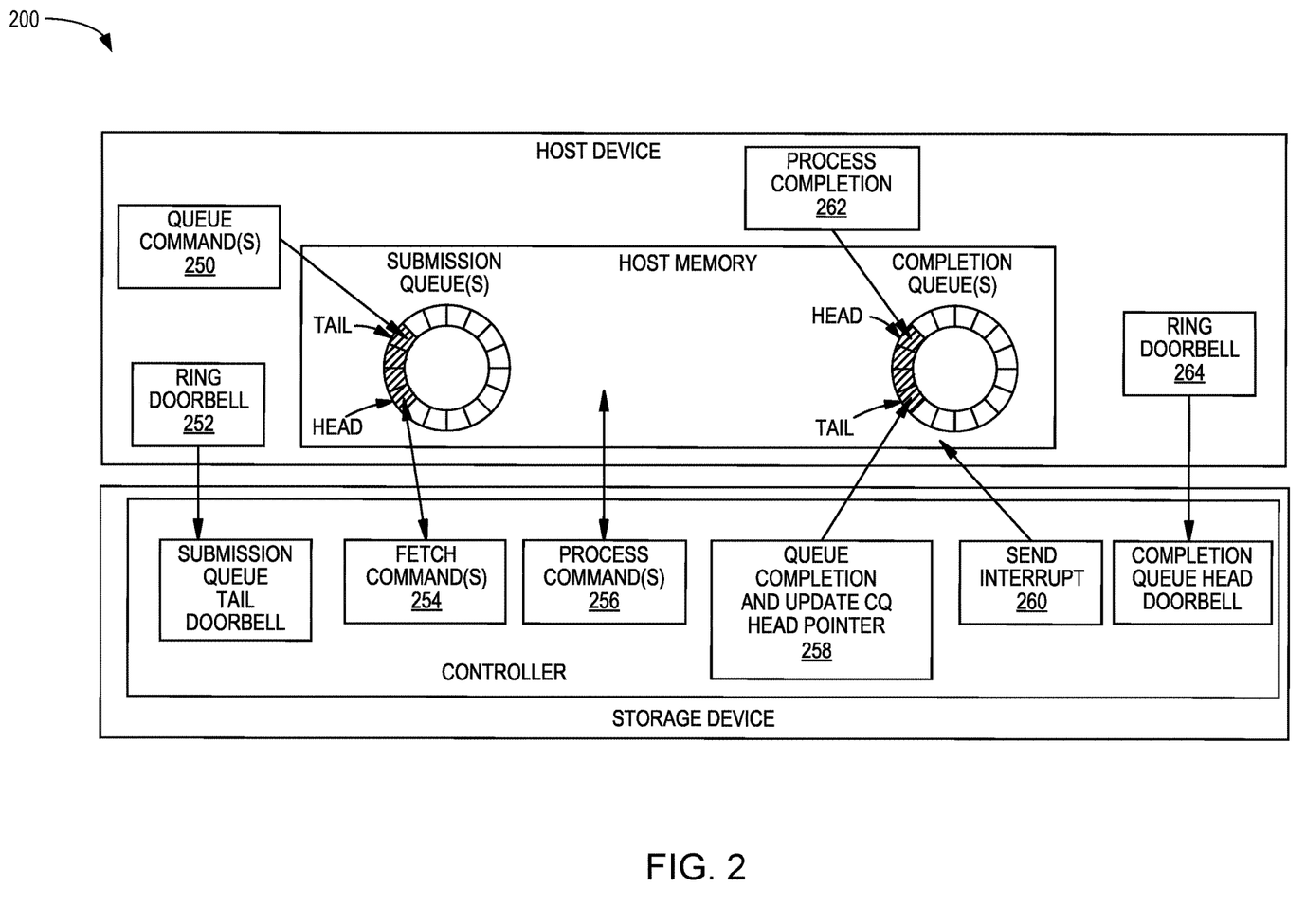
FIG. 2 is a block diagram illustrating a method of operating a storage device to execute a read or write command, according to certain embodiments.

FIG. 2 is a block diagram illustrating a method 200 of operating a storage device to execute a read or write command, according to one embodiment. Method 200 may be used with the storage system 100 of FIG. 1 having the host device 104 and the data storage device 106, where the data storage device includes the controller 108.

Method 200 begins at operation 250, where the host device writes a command into a SQ as an entry. The host device may write one or more commands into the SQ at operation 250. The commands may be read commands or write commands. The host device may comprise one or more SQs.

In operation 252, the host device writes one or more updated SQ tail pointers and rings a doorbell or sends an interrupt signal to notify or signal the storage device of the new command that is ready to be executed. The host may write an updated SQ tail pointer and send a doorbell or interrupt signal for each of the SQs if there are more than one SQs. In operation 254, in response to receiving the doorbell or interrupt signal, a controller of the storage device fetches the command from the one or more SQs, and the controller receives the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 258, once the command has been fully processed, the controller writes a completion entry corresponding to the executed command to a completion queue (CQ) of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the CQ is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
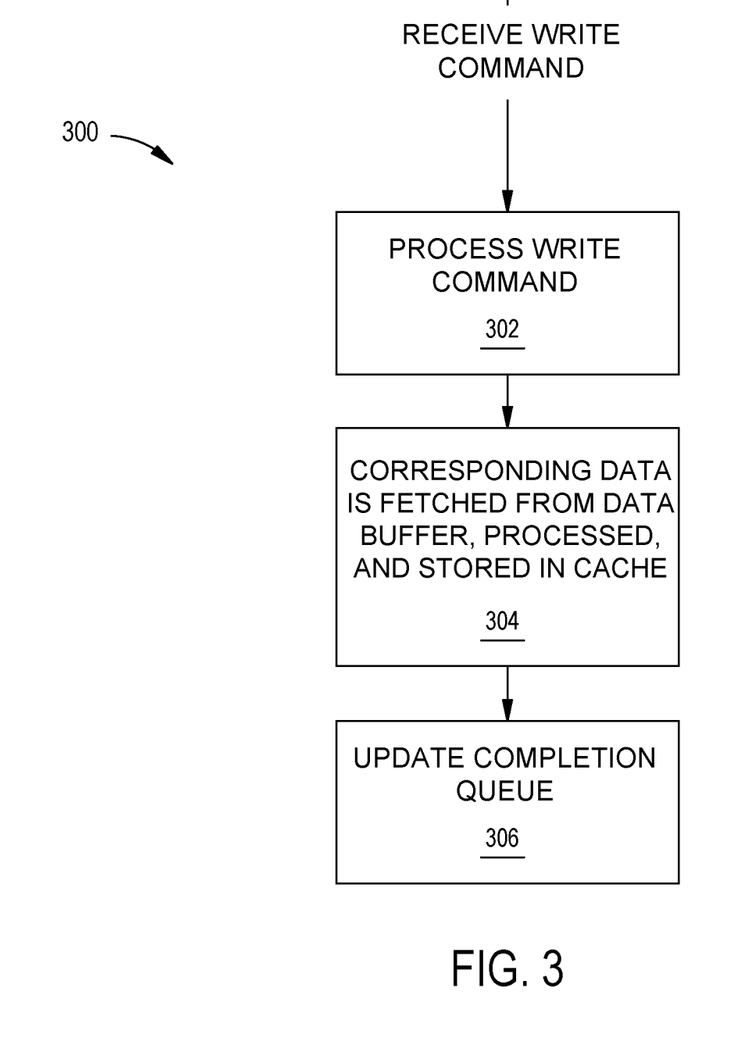
FIG. 3 is flowchart illustrating write command execution.

FIG. 3 is flowchart 300 illustrating write command execution. Initially, a write command is received. The write command is then processed at 302. Corresponding data for the write command is fetched from the host device at 304. The data is typically in a host device data buffer. The data is then processed and stored in cache. The cache may be the HMB, the CMB, controller DRAM, or NVM of the data storage device. Once the data is in cache, the completion queue is updated at 306.

As will be discussed herein, the write sequence is modified such that data can be stored in the HMB (or any similar host-based memory space) or CMB to delay the execution of host write commands to improve the overall write performance of the system. As such, more concurrent streams than open blocks is possible without negative impacts upon write performance.

The method is based on analyzing the write workflow and deciding that temporarily delaying the actual write to the memory device will benefit the overall write performance. Decisions may be based on host-specified or device-specified write alignment/granularity considerations. For example, writes that do not meet stream write granularity or namespace write granularity guidance may be coalesced. In another example, writes may be temporarily coalesced if emergency foreground maintenance is required in order to free open blocks, allowing the host to free write buffers while the device is concurrently unable to write new data to the memory device (i.e., NAND).

The write coalescing feature will involve a hardware (HW) modification such that host device pointers will be revised and written to point to HMB space. The HW will automatically direct memory access (DMA) the original payload to a new HMB location before auto-completing the command. Following the DMA, firmware (FW) or HW can release the write, which will then be resubmitted as if the write was a new write command, but without additional completion.

Figure 4:
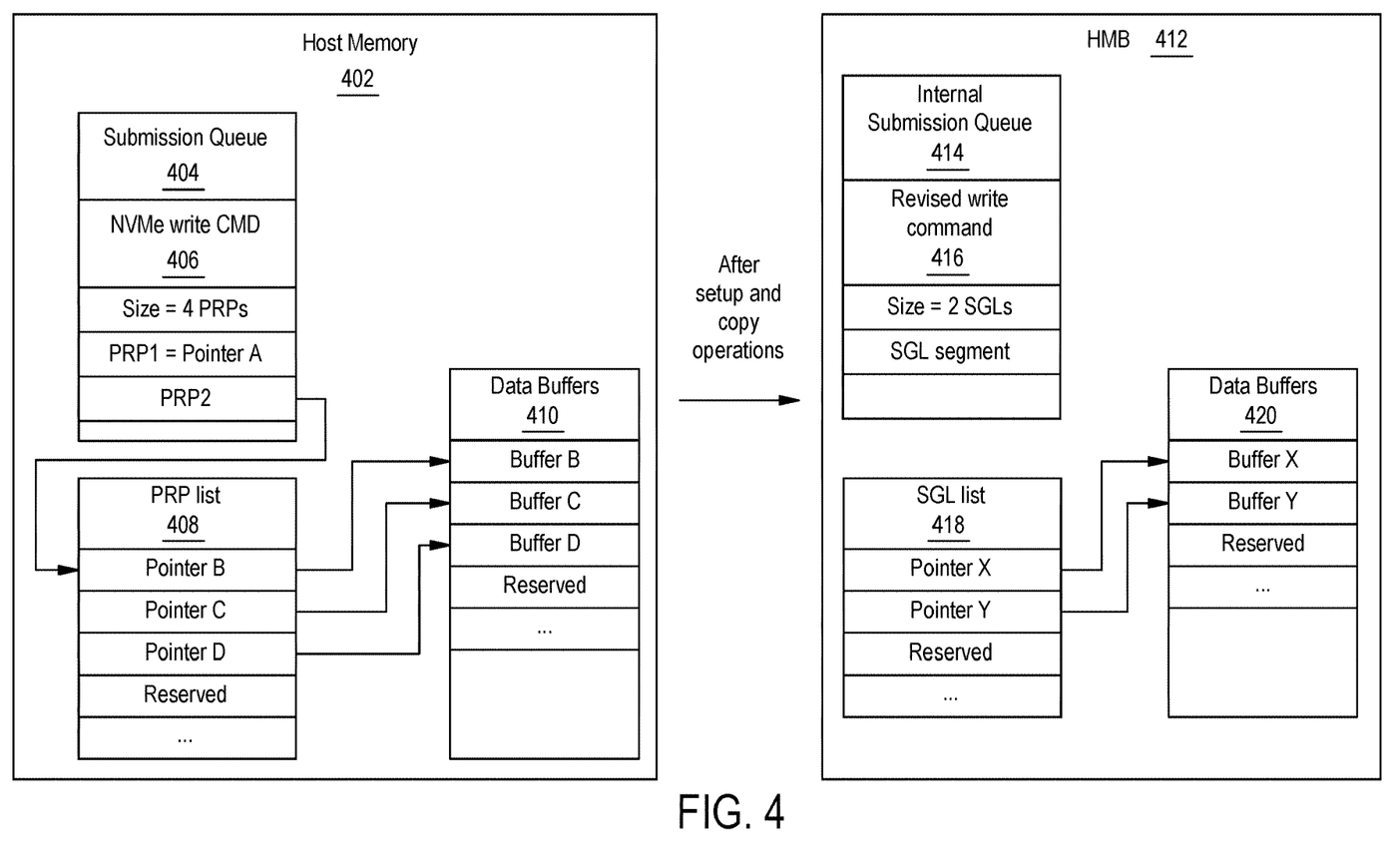
FIG. 4 is a schematic illustration of architecture incorporating write command coalescing according to one embodiment.

FIG. 4 is a schematic illustration of architecture incorporating write command coalescing according to one embodiment and depicts the concept using one example. The original NVMe write command 406 in the host memory 402 is queued by the host in the submission queue 404. The command 406 holds pointers to the data buffers. PRP1 holds a pointer to the first buffer. PRP2 holds a pointer to a PRP list 408 while each is a pointer to a data buffer 410. The device controller first fetches the original write command, classifies the original write command and decides whether to execute the write command now or to postpone. The decision is based on the classification results (e.g. stream ID) and the current state of the open blocks in the device. If the write command is postponed, the content of the write command is copied to HMB 412 with some adaptation. In FIG. 4, the revised command 416 uses the scatter-gather list (SGL) method and not physical region page (PRP). The revised command 416 containing the SGL segment is stored in an internal submission queue 404 implemented in HMB 412. The device prepares the SGL list 418 in the HMB 412 while each entry points to a data buffer 420 in HMB. The data from the original data buffers 410 is copied to the data buffers 420 allocated in HMB 412. A completion entry is posted to the host device. Later, the revised command 416 is executed by the data storage device while fetching all relevant information from HMB 412. A completion entry is not posted to the host device because the completion entry was already posted upon copying the original data from data buffers 410 to data buffers 420.

After command interpretation is done, the new "Write Coalescing module" can analyze the current write given the state of the last commands, the HMB contents and memory related characteristics. The module can then make a decision whether to delay the command using the HMB, write data directly to the storage device (regular write), or execute a previously delayed command from the HMB and write the delayed command data to the data storage device along with the current write data.

In case the host device issues a flush command that instructs the data storage device to write all the yet unwritten data to the memory device, the data storage device will perform all commands that were previously delayed and write the data to the memory device. In one embodiment, data storage devices usually have a limited number of open blocks reserved. Open blocks are blocks that are not fully written, where different protection mechanisms are applied due to reduced resilience to different factors. When a block is fully written the block becomes closed, and another block is opened instead. In host devices that support streams, an open block may be associated with a stream so that data written sequentially is written to the same physical block (meta-block). However, the number of streams supported by the host device may be greater than the number of available open blocks in the storage device. As discussed herein, it is proposed to use write coalescing to stack data that is related to a certain stream (that is not supported by an open block in the storage controller) in the HMB. The HMB based data may be written to the memory device when a full block is coalesced, or at another time determined by the controller, which allows effective support to any number of concurrent streams, without the need to dedicate space in the controller specifically for the task.

Figure 5:
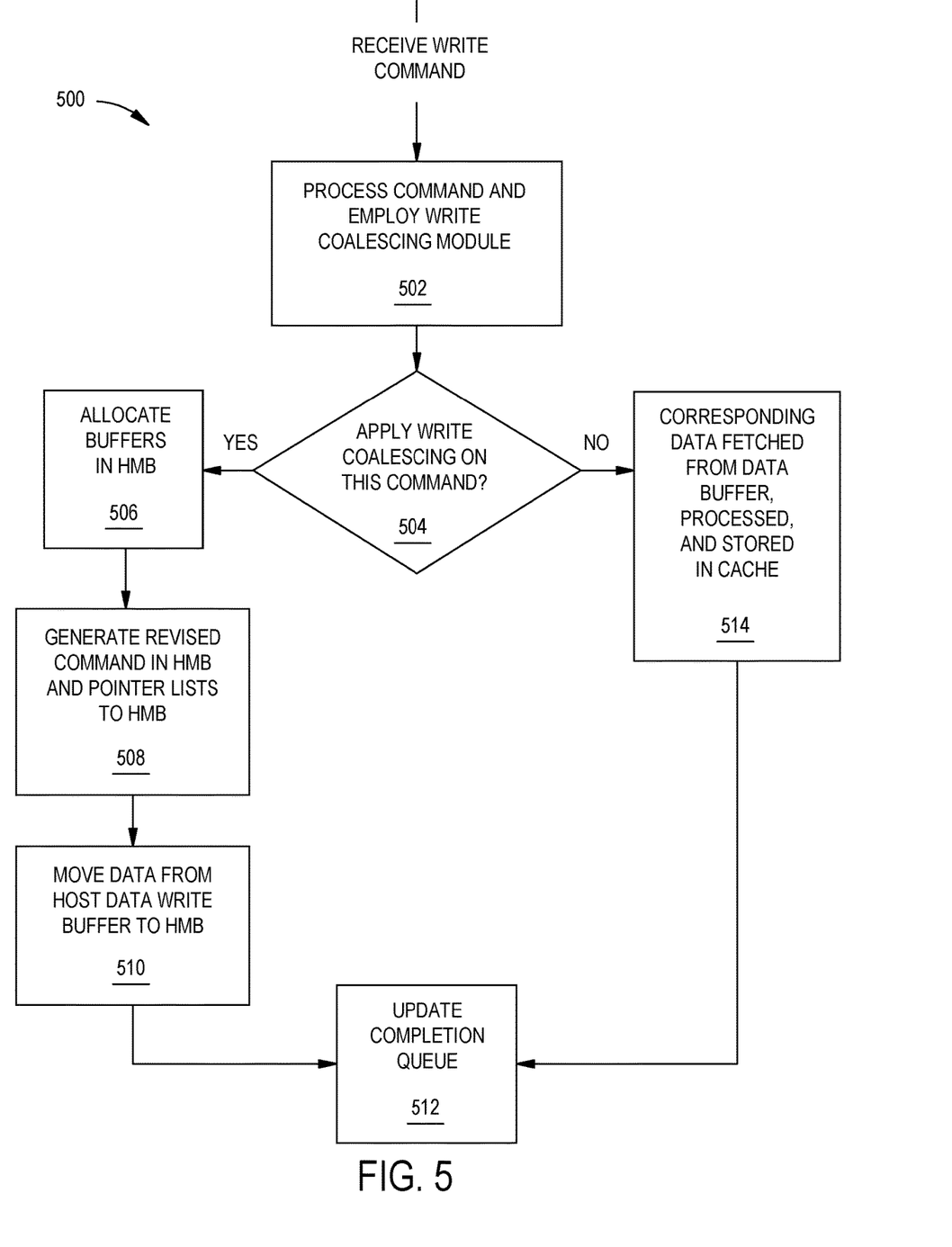
FIG. 5 is a flowchart illustrating write command coalescing according to one embodiment.

FIG. 5 is a flowchart 500 illustrating write command coalescing according to one embodiment which shows the write process. Initially, a write command is received, and classification of the write command (such as stream ID) and current state of the system (such as open block count) is performed at 502 in the Write Coalescing Module and a determination is made at 504 whether coalescing should be conducted on the command. In positive outcome, HMB space will be allocated at 506. A revised write command is generated in HMB with pointer lists to HMB at 508. The write command data contents copied to the allocated location at 510, and a completion entry is posted to the host device at 512. If write coalescing on the write command should not be applied at 504, the corresponding data is fetched from the data buffer, processed, and stored in cache at 514 followed by updating the completion queue at 512.

Figure 6:
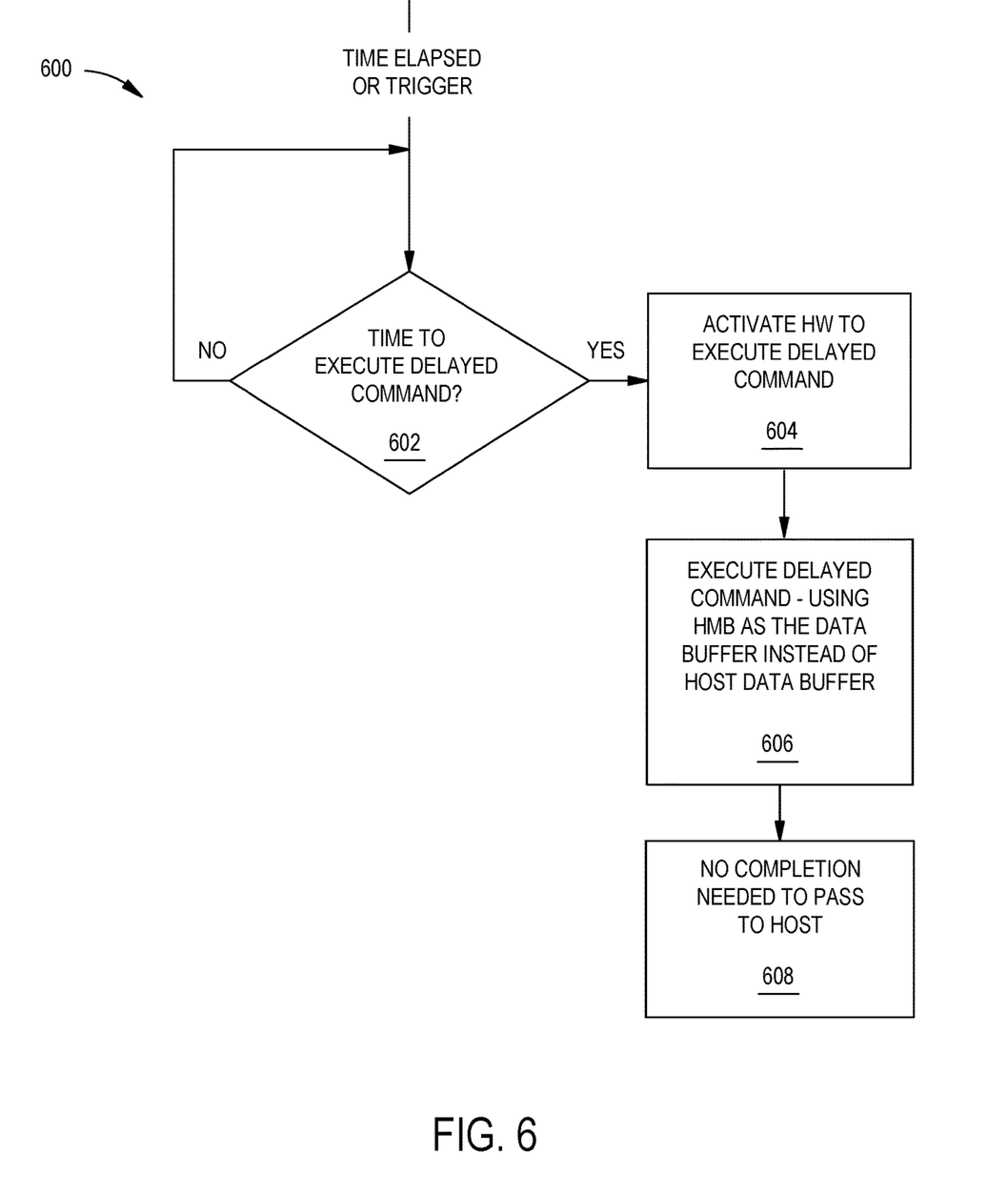
FIG. 6 is a flowchart illustrating delayed command flow execution according to one embodiment.

FIG. 6 is a flowchart 600 illustrating delayed command flow execution according to one embodiment and describes the decision to write the delayed write command contents to the data storage device from the HMB. The decision to execute the delayed command may be either caused by a "flush" command sent by the host device, or the number of open blocks changed (some blocks were closed) by the data storage device. When the decision to write the delayed write commands from the HMB is taken, the data will be written to the storage device and no additional overhead associated with posting completion entry to the host device is required.

In one embodiment, the device controller implements reserved SQs that are invisible to the host device. The data storage device queues the revised write commands in the reserved SQs. Where there is a trigger to execute some of the revised commands, the data storage device simply rings the doorbells of the relevant, reserved SQs. The revised write commands in the reserved SQs are then executed normally with the exception being there is no posting to the CQ. Stated another way, while reserved SQs are present, there are no corresponding reserved CQs and hence no place to post any completion. A completion does not need to be posted to the normal CQ because a completion should have been previously posted. The number of reserved SQs may be a function of supported streams and open blocks.

When cached operation is disabled by the host device either globally or specific for a command, the same flow will work with the only difference being that a completion will be sent only after completing the execution of the revised commands and only after the data is stored in the memory device (e.g., NAND).

In flowchart 600, once a trigger event occurs or a predetermined time has elapsed, a determination is made at 602 regarding whether it is time to execute delayed commands. A trigger event could be a flush command, for example. If it is not time to execute the delayed write command, then the process continues to wait. If it is time to execute the delayed write command, then the HW is activated to execute the delayed write command at 604, and the delayed write command is executed at 606. The delayed write command is executed using the HMB as the data buffer rather than the host data buffer as in the original write command. Upon completion of the delayed write command, the completion queue is not updated at 608 because the completion queue was previously updated upon creating the delayed write command and storing the data in the HMB buffer.

In another embodiment, CMB based write delay for coalescing of small write commands may be employed. The CMB is a memory buffer located in the data storage device controller that may be used for different host device applications. In this context, the CMB may be used as a memory space (although typically a much smaller one) to delay shorter write commands.

Figure 7:
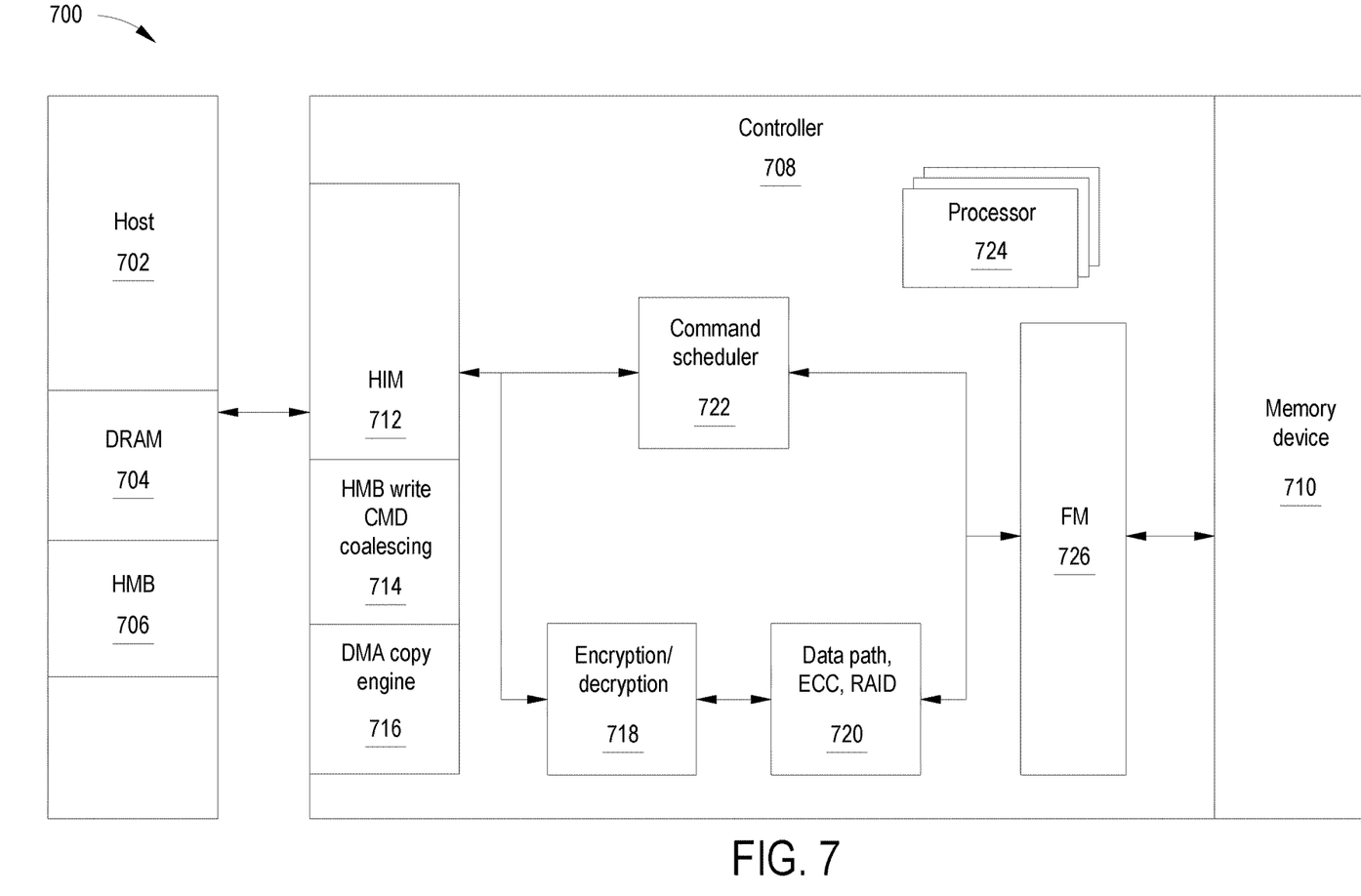
FIG. 7 is a schematic illustration of a system incorporating write command coalescing according to one embodiment.

FIG. 7 is a schematic illustration of a system 700 incorporating write command coalescing according to one embodiment and depicts the high-level block diagram of the system for write command coalescing. The system 700 includes a host device 702 having DRAM 704 and HMB 706. The system 700 also includes a memory device 710 and a data storage device controller 708.

The controller 708 includes one or more processors 724, a flash interface module (FIM) 726 for interfacing with the memory device 710, a host interface module (HIM) 712 for interfacing with the host device 702, a command scheduler 722 coupled between the FIM 726 and HIM 712, an encryption/decryption modules 718 disposed between the FIM 726 and HIM 712, and a data path and ECC and RAID disposed between the encryption/decryption module 718 and FIM 726. The HIM 712 includes a HMB Write Command Coalescing module 714 that decides when to execute the write command while activating the DMA Copy engine 716 for copying the command and all data structures with some modifications from host device 702 memory to the HMB 706.

In one embodiment, the revised command held in HMB could be a write scatter command which contains several LBA ranges and not only one. In the write scatter command embodiment, several host device write commands could be compressed to a single revised write scatter command stored in HMB. In another embodiment, grouping of delayed write commands may be based on a context attribute identifier, or based on region/zone in a DPM/ZNS device.

Figure 8:
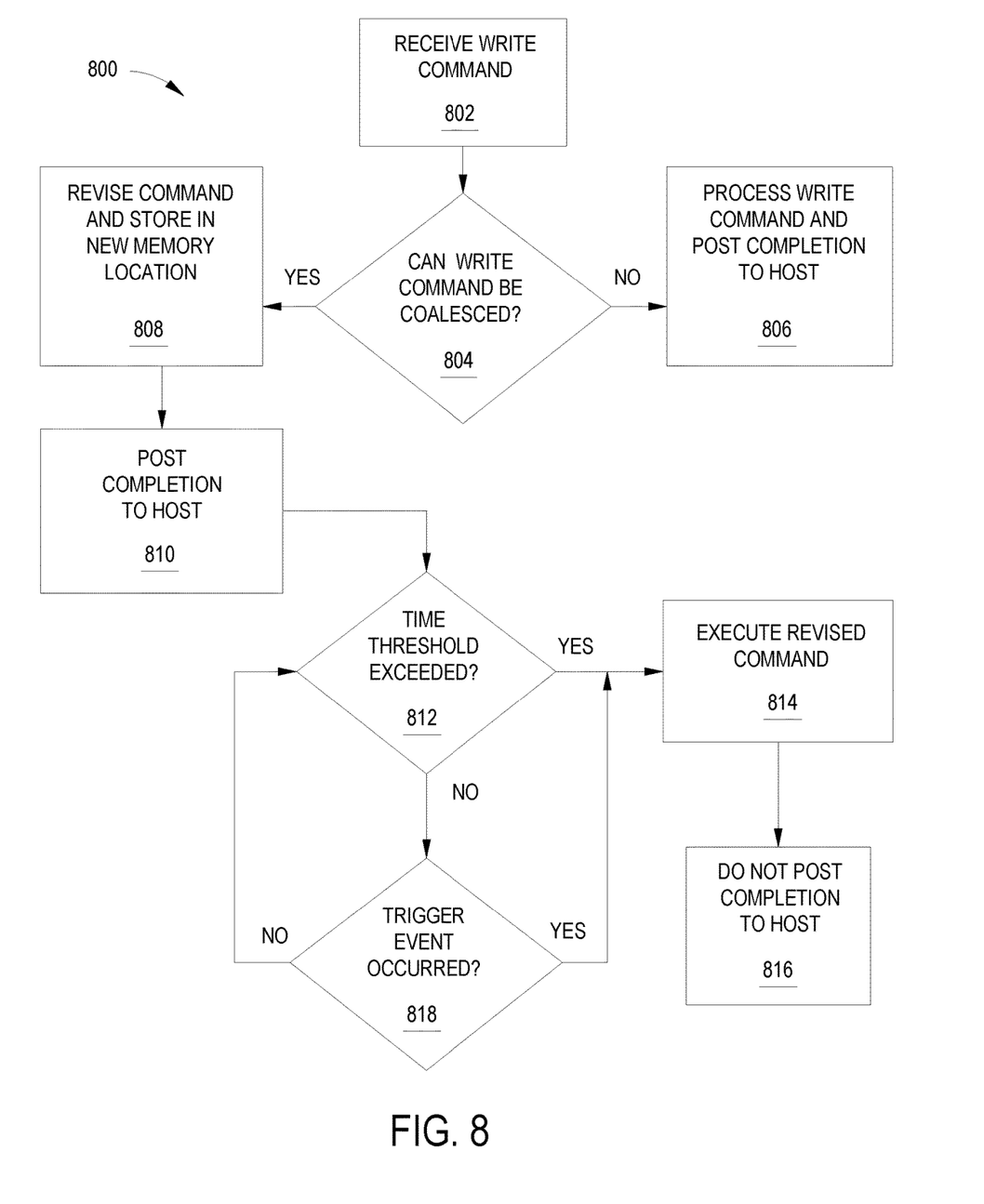
FIG. 8 is flowchart illustrating write command coalescing and execution according to one embodiment.

FIG. 8 is flowchart 800 illustrating write command coalescing and execution according to one embodiment. The process begins when a write command is received at 802, or more specifically, a write command is placed in a submission queue in the host and the doorbell is rung to inform the data storage device that there is a command to fetch in the submission queue. A determination is made regarding whether the write command can be coalesced at 804. If the write command cannot be coalesced at 804, then the write command is executed as normal and the completion queue is updated to indicate that the write command has been executed.

If the write command can be coalesced at 804, then the write command is revised and stored in a new location along with the data at 808. In one embodiment the new location is HMB. In another embodiment, the new location is CMB. In still another embodiment, the new location is within the host controller volatile memory. Regardless, in any embodiment, the new location is not the NVM to which the data of the original write command is ultimately to be written. After revising the write command and storing the associated data in the new location, the completion queue is updated by posting the completion to the completion queue at 810 and ringing the doorbell to inform the host that the write command has been completed, even though the write command has not actually been completed. At this point in time, the write command has been revised and the data has been moved to the new location. The revised write command will be executed at a later point in time at which point the original write command will technically have finally been completed.

The revised write command can be executed after either a predetermined period of time has elapsed or a trigger event has occurred. If the time threshold has been exceeded at 812, then the revised command is executed at 814 and no completion is posted to the completion queue at 816. If the time threshold has not been exceeded at 812, then a determination is made regarding whether a trigger event has occurred at 818. If a trigger event has occurred at 818, then the revised command is executed at 814 and no completion is posted to the host at 816. If no trigger event has occurred at 818, then the revised write command is still not executed and simply waits to be executed. It is to be noted that checking for a trigger event and whether the time threshold has been exceeded may occur in any order or simultaneously. An example of a trigger event is receipt of a flush command from the host. Regardless, whenever the revised write command is executed, the host is not informed because the host believes the write command has already been completed and does not and did not know of the existence of the revised write command.

In any event, the host is informed that the original write command has been completed prior to the revised write command being completed. Stated another way, the host device believes the original write command has been completed even though the original write command has not actually been completed and the data to be written to the NVM has not yet been written to the NVM. Completing the revised write command, which technically completes the original write command by writing the data to the NVM, occurs later in time than the host believes and thus write command is handled more effectively and efficiently. The location to store the revised write command and associated data while waiting to be executed is in a memory location such as HMB, CMB, or other storage location that is not the ultimate, final storage location indicated by the original write command (i.e., NVM or NAND).

By utilizing write command coalescing in the HMB (or CMB or other storage area) improved write performance for different scenarios, such as having more concurrent streams than open blocks, occurs and thus write commands are handled more effectively and efficiently.

In one embodiment, a data storage device comprises: a first memory device; and a controller coupled to the memory device, wherein the controller is configured to: receive a write command; determine the write command can be write coalesced; allocate one or more buffers in a second memory device separate and distinct from the first memory device; generate a revised write command from the write command; and move data associated with the write command to at least one buffer of the allocated one or more buffers. The controller is further configured to generate pointer lists to the at least one buffer. The controller is configured to update a completion queue for the write command. The updating occurs prior to completing the write command. The updating occurs after execution of the revised write command. The second memory device is a host memory buffer (HMB). The second memory device is a controller memory buffer (CMB). The write command is a non-volatile memory express (NVMe) write command using one or more physical region page (PRP) entries. The revised write command uses scatter-gather list (SGL) elements). The controller is further configured to execute the revised write command in response to either a trigger mechanism or an elapsed predetermined period of time as passed.

In another embodiment, a data storage device comprises: a first memory device; and a controller coupled to the memory device, wherein the controller is configured to: receive a write command; revised the write command to create a revised write command; store the revised write command in a second memory device distinct from the first memory device; determine that a predetermined period of time has elapsed or a trigger mechanism has occurred; and execute the revised write command. The controller is further configured to activate hardware (HW) to execute the revised write command. Executing the revised write command includes retrieving data associated with the revised write command from the second memory device. Storing the revised write command in the second memory device comprises storing the revised write command and data associated with the write command in the second memory device. Executing the revised write command comprises retrieving data associated with the write command from the second memory device and writing the data to the first memory device. A completion queue in a host device is updated prior to executing the revised write command. The completion queue is not updated after executing the revised write command.

In another embodiment, a data storage device comprises: memory means; and a controller coupled to the memory means, wherein the controller is configured to: convert a write command from physical region page (PRP) entries to scatter-gather list (SGL) entries; store data associated with the PRP entries and the converted write command in a host device; inform the host device that the write command is completed; and execute the converted write command after the informing, wherein the executing comprises writing the stored data to the memory means. The controller is configured to not inform the host device that the converted write command is executed. The controller is configured to execute the converted write command after receiving a flush command from the host device.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a first memory device; and
a controller coupled to the first memory device, wherein the controller is configured to:
receive a write command, wherein the write command uses physical region page (PRP) entries;
determine the write command can be write coalesced, wherein the controller is configured to write coalesce by stacking data that is related to a certain stream in host memory buffer (HMB) and write the data to the first memory device without dedicating space in the controller for the write coalescing to support a number of concurrent streams that is greater than a number of available open blocks in the storage device;
allocate one or more buffers in a second memory device separate and distinct from the first memory device;
generate a revised write command from the write command, wherein the write command is an original write command, wherein the revised write command is logically equivalent to the original write command, and wherein the revised write command uses scatter-gather list (SGL) entries and not physical region page (PRP) entries; and
move data associated with the write command to at least one buffer of the allocated one or more buffers for the write coalescing.

2. The data storage device of claim 1, wherein the controller is further configured to generate pointer lists to the at least one buffer.

3. The data storage device of claim 1, wherein the controller is configured to update a completion queue for the write command.

4. The data storage device of claim 3, wherein the updating occurs prior to completing the write command.

5. The data storage device of claim 3, wherein the updating occurs after execution of the revised write command.

6. The data storage device of claim 1, wherein the second memory device is the HMB.

7. The data storage device of claim 1, wherein the write command is a non-volatile memory express (NVMe) write command using one or more PRP entries.

8. The data storage device of claim 1, wherein the controller is further configured to execute the revised write command in response to either a trigger mechanism or an elapsed predetermined period of time as passed.

9. A data storage device, comprising:
a first memory device; and
a controller coupled to the first memory device, wherein the controller is configured to:
receive a write command, wherein the write command uses physical region page (PRP) entries;
revised the write command to create a revised write command, wherein the write command is an original write command, wherein the revised write command is logically equivalent to the original write command, and wherein the revised write command uses scatter-gather list (SGL) elements and not physical region page (PRP) entries;
store the revised write command in a second memory device distinct from the first memory device during write coalescing, wherein the controller is configured to write coalesce by stacking data that is related to a certain stream in host memory buffer (HMB) and write the data to the first memory device without dedicating space in the controller for the write coalescing to support a number of concurrent streams that is greater than a number of available open blocks in the storage device;
determine that a predetermined period of time has elapsed or a trigger mechanism has occurred; and
execute the revised write command for the write coalescing.

10. The data storage device of claim 9, wherein the controller is further configured to activate hardware (HW) to execute the revised write command.

11. The data storage device of claim 10, wherein executing the revised write command includes retrieving data associated with the revised write command from the second memory device.

12. The data storage device of claim 11, wherein storing the revised write command in the second memory device comprises storing the revised write command and data associated with the write command in the second memory device.

13. The data storage device of claim 9, wherein executing the revised write command comprises retrieving data associated with the write command from the second memory device and writing the data to the first memory device.

14. The data storage device of claim 13, wherein a completion queue in a host device is updated prior to executing the revised write command.

15. The data storage device of claim 14, wherein the completion queue is not updated after executing the revised write command.

16. A data storage device, comprising:
   memory means; and
   a controller coupled to the memory means, wherein the controller is configured to:
      convert a write command from physical region page (PRP) entries to scatter-gather list (SGL) entries, wherein the write command is an original write command, and wherein the converted write command is logically equivalent to the original write command;
      store data associated with the PRP entries and the converted write command in a host device during write coalescing, wherein the controller is configured to write coalesce by stacking data that is related to a certain stream in host memory buffer (HMB) and write the data to the memory means without dedicating space in the controller for the write coalescing to support a number of concurrent streams that is greater than a number of available open blocks in the storage device;
      inform the host device that the write command is completed; and
      execute the converted write command after the informing, wherein the executing comprises writing the stored data to the memory means for the write coalescing.

17. The data storage device of claim 16, wherein the controller is configured to not inform the host device that the converted write command is executed.

18. The data storage device of claim 16, wherein the controller is configured to execute the converted write command after receiving a flush command from the host device.

* * * * *